(12) United States Patent
Muro et al.

(10) Patent No.: US 7,813,642 B2
(45) Date of Patent: Oct. 12, 2010

(54) OPTICAL TRANSMISSION APPARATUS AND METHOD OF CONTROLLING THE SAME

(75) Inventors: Shinichirou Muro, Kawasaki (JP); Hideaki Sugiya, Kawasaki (JP); Yasushi Sugaya, Kawasaki (JP); Etsuko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 531 days.

(21) Appl. No.: 11/843,084

(22) Filed: Aug. 22, 2007

(65) Prior Publication Data
US 2008/0080865 A1    Apr. 3, 2008

(30) Foreign Application Priority Data
Sep. 29, 2006   (JP) .............................. 2006-267344

(51) Int. Cl.
*H04J 14/02* (2006.01)
(52) U.S. Cl. .......................................... 398/95; 398/83
(58) Field of Classification Search ............. 398/83–85, 398/37–38, 94
See application file for complete search history.

(56) References Cited

U.S. PATENT DOCUMENTS

2003/0099475 A1   5/2003   Nemoto et al. ................ 398/83

2006/0269284 A1*  11/2006  Fujita ........................... 398/38

FOREIGN PATENT DOCUMENTS

| JP | 2002-353939 | 12/2002 |
| JP | 2003-163641 | 6/2003 |

\* cited by examiner

*Primary Examiner*—Leslie Pascal
(74) *Attorney, Agent, or Firm*—Fujitsu Patent Center

(57) ABSTRACT

The present invention relates to an optical transmission apparatus capable of suppressing a transitional gain variation when a number of signal wavelengths changes, and maintaining communication quality in optical signals. The optical transmission apparatus is provided with an optical power control device that varies light power of light for each wavelength component corresponding to a wavelength channel, the light including signal light and spontaneous emission light; a wavelength arrangement information obtaining unit that obtains arrangement information of the wavelength channel of the signal light; and a control unit that controls the power control device based on the arrangement information obtained at the wavelength arrangement information obtaining unit so that light power of a wavelength component of the signal light and light power of a wavelength component other than the wavelength component of the signal light become substantially equal.

12 Claims, 12 Drawing Sheets

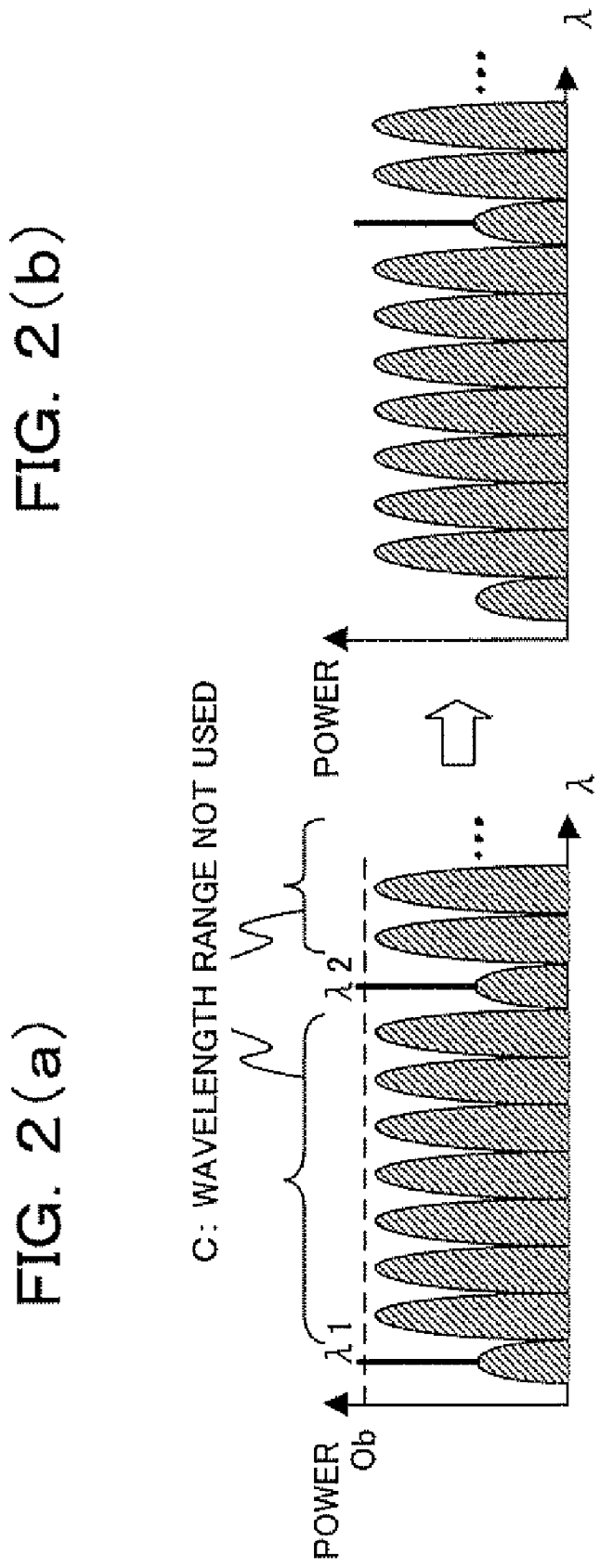

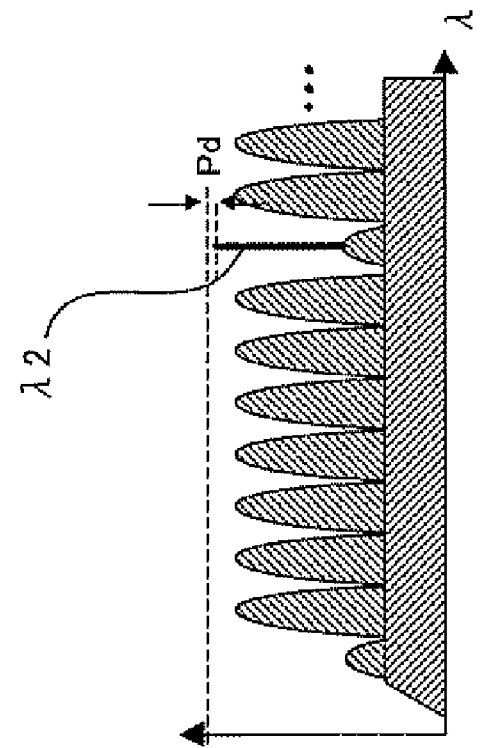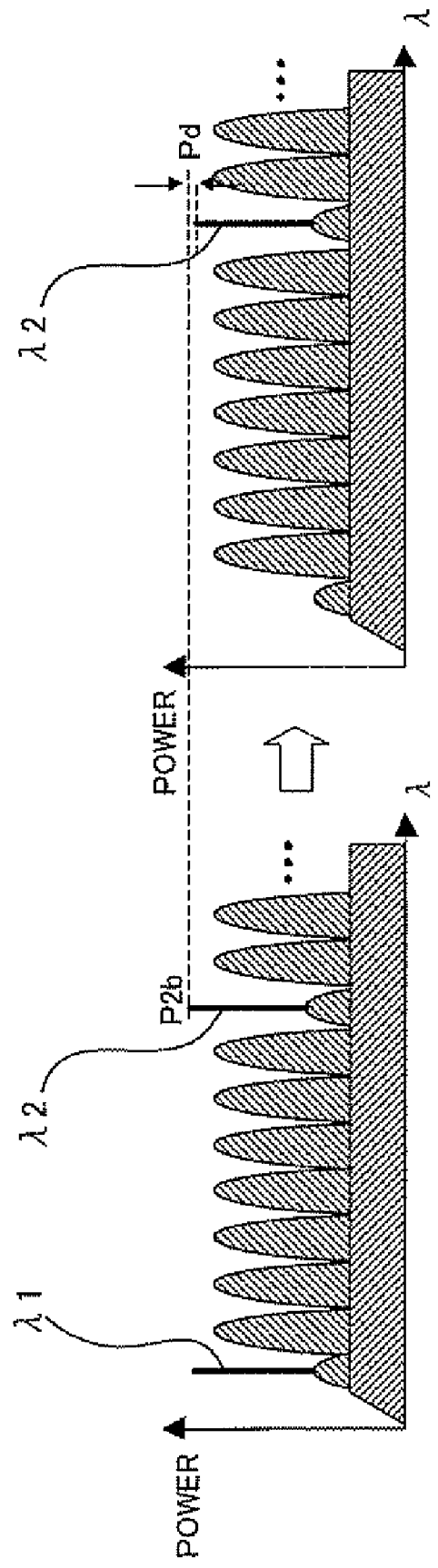

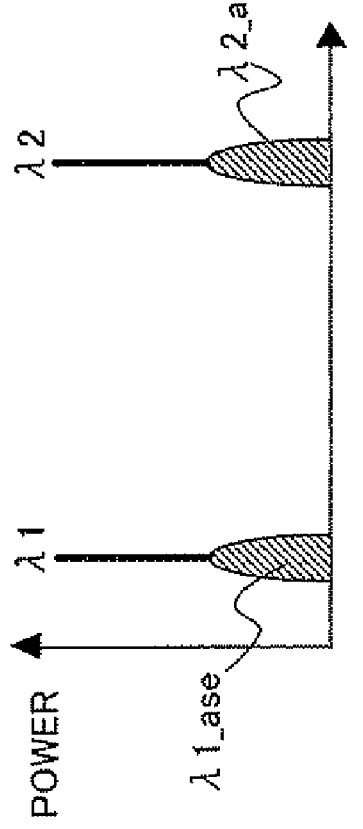
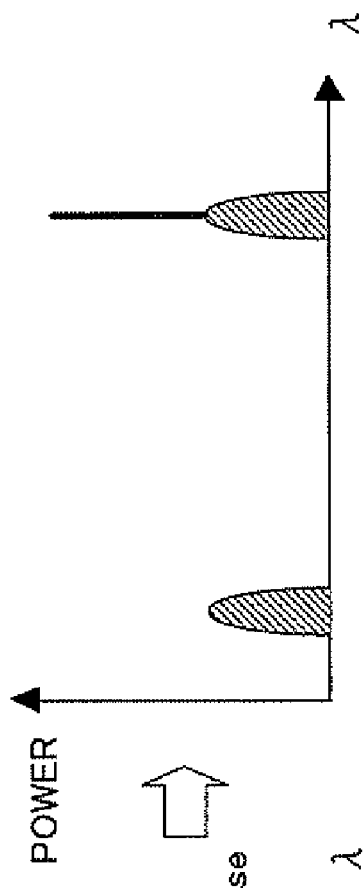
FIG. 10(a) RELATED ART
FIG. 10(b) RELATED ART

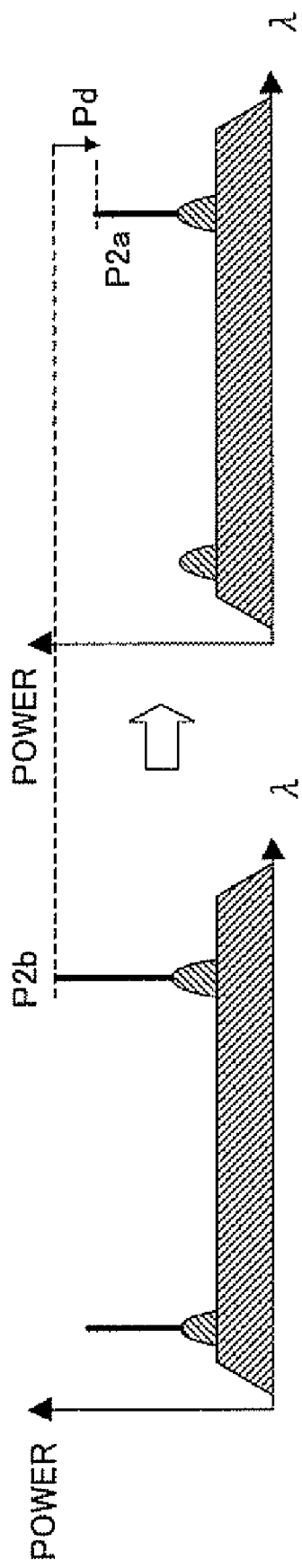

OPTICAL TRANSMISSION APPARATUS AND METHOD OF CONTROLLING THE SAME

BACKGROUND OF THE INVENTION

1. Field of the Invention

The present invention relates to an optical transmission apparatus and a method of controlling the same, and in particular, to an optical transmission apparatus that is suitably used in an optical network for multiwavelength transmission of optical signals, and a method of controlling the same.

2. Description of the Related Art

In recent years, as one example of multiwavelength optical transmission systems, an optical network (metro core) system has been gaining attentions in which system local cities as regional bases are connected and an optical signal with a given wavelength may be added or dropped at a given node provided for a base.

FIG. 6 is a block diagram showing a configuration example of a metro core system. In a multiwavelength optical transmission system 100 that constitutes the metro core system, a plurality of OADM (Optical Add-Drop Multiplexer) nodes 101 (for example, 101-1, 101-2, and 101-n in FIG. 6) capable of adding or dropping optical signals, an optical broadband HUB that is not depicted in the drawing, an optical switching HUB, and the like are connected through a transmission line optical fiber 102, respectively. Further, by setting a signal path between given OADM nodes 101 in the plurality of OADM node 101, communication by means of multiwavelength signal light becomes possible.

It should be noted that optical amplifiers 103 (preamplifier and postamplifier) are provided, as necessary, respectively at stages preceding and following each of the OADM nodes 101 and the optical transmission apparatus. These amplifiers serves to compensate loss of signal light power received at the transmission line optical fiber 102 and the OADM node 101.

In the communication between the above OADM nodes 101, because switching between signal paths is dynamically performed at the OADM node 101 in operation, a number of signal wavelengths transmitted through the system dynamically varies. It is necessary to maintain communication quality of individual optical signals even if such a variance in the number of signal wavelengths occurs frequently. In order to maintain output optical power of each signal wavelength constant against this variance in the number of wavelengths (maintain gain flatness to wavelength), an AGC amplifier having an automatic gain control (AGC) function is typically employed for the optical amplifier 103. A fiber amplifier such as an EDFA (Erbium Doped Fiber Amplifier), for example, is used as this optical amplifier 103.

FIG. 7 is a diagram showing a configuration example of the OADM node 101. This OADM node 101 is provided with a wavelength demultiplexer 111, a branch coupler 112 for branching the signal light at its node 101 (to a drop path 101d), an optical switch 113 for selecting either to pass the signal light or add (light from an add path 101a) at its node 101, a Variable Optical Attenuator (VOA) 114 for adjusting power of the light from the optical switch 113, and a wavelength multiplexer 115.

An attention is now paid to a configuration of an OADM node 101-2 shown in FIG. 6. Multiwavelength signal light input from an OADM node 101-1 that is provided upstream to the OADM node 101-2 in the transmission line optical fiber 102 is divided by the wavelength demultiplexer 111 included in the OADM node 101-2 into individual signal wavelengths, as shown in FIG. 7.

Then, it is determined whether each divided signal light is dropped at the OADM node 101-2 or passed (through) according to the setting of the optical switch 113 that is positioned next. For the wavelength that is dropped at the OADM node 101-2, the light from the add path may be added to the light output to the side of the OADM node 101-n by the optical switch 113. In this manner, the output power of the signal light that has passed the optical switch 113 is adjusted at the VOA 114 to be output to the wavelength multiplexer 115. At the wavelength multiplexer 115, the optical signals divided into the individual wavelengths are re-multiplexed, and output to the side of the OADM node 101-n through the transmission line optical fiber 102 that is on the downstream.

FIG. 8 is a diagram showing an example of spectra of the multiwavelength light transmitted through the transmission line optical fiber 102 in the communication between the OADM nodes 101; in other words, the diagram shows an example of the light spectra output from the wavelength multiplexer 115 shown in FIG. 7. An abscissa axis indicates the wavelength ($\lambda$), and an ordinate axis indicates the light power (Power). At the wavelength multiplexer 115, as shown in FIG. 8, the signal light of each wavelength (see A in FIG. 8), and spontaneous emission light having a wavelength range of the signal light as noise light produced in amplification at the optical amplifier 103 (ASE: Amplified Spontaneous Emission, see B in FIG. 8) are transmitted in an accumulated state to the transmission line optical fiber 102 on the downstream side.

Note that, a path for a wavelength that is unused as signal light (see C in FIG. 8) between the OADM nodes 101, it is set so that the light does not pass based either on the switching at the optical switch 113 or on light attenuation control at the VOA 114.

Note that, Patent Document 1 describes a transmission apparatus that is provided with a VOA equivalent to that of the conventional art as described above.

Further, as the conventional art related to the present invention, there is a transmission apparatus as described in Patent Document 2.

[Patent Document 1] Japanese Patent Laid-Open No. 2003-163641

[Patent Document 2] Japanese Patent Laid-Open No. 2002-353939

However, in the conventional optical transmission apparatus, as shown in FIG. 6, if a number of transmission wavelengths changes when the OADM nodes 101 in the multiwavelength transmission system 100 are in a cascading connection, a delay occurs transitionally in power control of optical signals immediately after the change. Specifically, immediately after the number of transmission wavelengths changes, in a state that VOA control does not transitionally reflect the change of the number of transmission wavelengths, the optical signals are output to the downstream-side transmission line.

Therefore, a problem has been noted that, when performing communication between the OADM nodes provided at multiple stages, it is expected that an amount of variation in the signal power is accumulated, and accordingly, the power of the optical signals in a receiving-side apparatus goes down below a reception range, i.e. the signals may not be recognized as signals or a signal-to-noise ratio deteriorates, thereby causing a reception error or deterioration in communication quality.

FIG. 9 to FIG. 11 are illustrations of examples of signal power change according to the change in the number of signal wavelengths. A case is assumed in which, as shown in FIG. 9, for example, when one wavelength ($\lambda1$) is added from the OADM node 101-1 and one wavelength (λ2) is added from the OADM node 101-2 in the multiwavelength transmission system 100, an interruption occurred in the OADM node 101-1 eliminates the one wavelength transmitted from the OADM node 101-1, thereby reducing the number of signal wavelengths to optical signals of only one wavelength (λ2) from optical signals of two wavelengths (λ1, λ2).

FIG. 10(a) and FIG. 10(b) respectively show a change in wavelength in the stage for being output from the wavelength multiplexer 115 in the OADM node 101-2 when the optical signals change from two wavelengths to one wavelength in this manner. An abscissa axis indicates wavelength (λ), and an ordinate axis indicates power of each optical signal.

At this time, at the preceding stage at which the number of signal wavelengths decreases, as shown in FIG. 10(a), light including the optical signals (λ1, λ2) and ASE (λ1_ase, λ2_ase) in the vicinity of the optical signals (λ1, λ2) is output as output light output from the wavelength multiplexer 115. The reason why ASE including a wavelength component that is not in the vicinity of the optical signals (λ1, λ2) is not output is that the ASE outside the wavelength range that is used for the optical signals is eliminated by the operation of the optical switch 113 or the VOA 114.

In contrast, after the number of wavelengths decreases in the above manner, the one-wavelength optical signals are input to the OADM node 101-2. At this time, immediately after the change in the number of signal wavelengths, until the VOA 114 in the OADM node 101-2 detects the absence of signals and performs adjustment, when routed through the wavelength demultiplexer 111, as shown in FIG. 10(b), the signal light λ2 and ASE (λ1_ase, λ2_ase) respectively in the vicinity of the wavelength λ1, λ2 are output to be input to the following optical amplifier 103.

Immediately after the number of wavelengths of the optical signals becomes one wavelength, in order to maintain the communication quality of the optical signals, the following optical amplifier 103 automatically controls gain of the signal light λ2 so that the signal light λ2 is stabilized to an average power of the wavelength components (λ1, λ2). Specifically, a target power at which the gain of the signal light λ2 is controlled becomes equal to an average value of the power of the signal light λ2 at this time and the power of the ASE light component λ1_ase after the signal light component is removed to be relatively low in level.

Further, when such a change in the number of wavelengths occurs, there is a case in which the change in the signal light gain increases with SHB (spatial hole burning) being a major factor, for example, during a transitional period of time until which response control by the AGC amplifier 103 is stabilized. FIG. 11(a) and FIG. 11(b) are diagrams showing light spectra output from the optical amplifier 103 in the change of the signal wavelengths shown in FIG. 9. An abscissa axis indicates wavelength (λ) and an ordinate axis indicates power of each optical signal.

At this time, in a state before the change of the number of signal wavelengths, as shown in FIG. 11(a), because the gain of the optical signals λ1 decreases when the wavelength of the optical signals λ1 input into the optical amplifier 103 corresponds to a hole of the SHB, a power deviation virtually occurs between the two optical signals λ1 and λ2 output from the optical amplifier 103.

After this, when the number of signal wavelengths changes to eliminate the one wavelength (λ1) on a short wavelength side, and only the one wavelength (λ2) on long wavelength side is left, an effect of the SHB is reduced, the optical amplifier 103 reduces the power that the one wavelength (λ2) originally had by an arrow Pd, during the transitional response time period immediately after the change of the number of signal wavelengths, as shown in FIG. 11(b).

Such power, that is, the amount of gain variation may be ignorable as a slight variation in the amount of power when considering the single OADM node 101-2 alone. However, when the OADM nodes 101-1 to 101-n are in a cascading connection, the variation in signal power is eventually accumulated as moving onto a downstream-side stage in the transmission path. A problem has been noted that, when an amount of the accumulation of the variation in signal power becomes large, the power of optical signals goes down below a reception range, i.e. the signals may not be recognized as signals or a signal-to-noise ratio deteriorates, thereby causing a reception error or deterioration in communication quality.

Examples of factors that cause the signal gain variation in response to the change in the number of wavelengths include (1) SHB as described above, as well as (2) gain (wavelength) deviation and (3) Stimulated Raman Scattering (SRS) effect. The following describes these factors, respectively.

(1) SHB

A first factor, the SHB, is a phenomenon caused when EDFA is applied to the optical amplifier 103, for example, and shows a characteristic that the optical signal gain on the short wavelength side becomes lower. For example, when optical signals of one wavelength (for example, 1538 nm) in a C band (1530-1565 nm) is input to the optical amplifier 103, phenomena are caused such that an EDFA gain in the vicinity of the signal wavelength is decreased (this phenomenon is called a main hole), and an EDFA gain in the vicinity of 1530 nm is also decreased (this phenomenon is called a second hole).

Further, the SHB has a characteristic that the main hole in the C band becomes deeper on the short wavelength side (larger in an amount of gain decrease), and both the main hole and the second hole becomes deeper as the optical signal input power is greater. In addition, the SHB has a smaller effect when signal light of multiple wavelengths is input, and its effect increases as the number of wavelengths that are input decreases.

(2) Gain Deviation

A second factor, the gain (wavelength) deviation, is a phenomenon caused in an optical amplifier. Specifically, the optical amplifier controls so that an average gain of the signal light is maintained constant (AGC), and when a wavelength having a deviation remains, the output optical power of the remaining optical signals varies because the optical amplifier operates so that the gain of the signal light matches with the target gain.

(3) SRS Effect

A third factor, the SRS effect, is a phenomenon caused in the optical fiber transmission line or the distributed compensation fiber. In transmitting the multiwavelength optical signals through the optical fiber, the signal light power on the short wavelength side amplifies signal light on the long wavelength side as excitation light power, and as a result, a phenomenon is caused such that the signal light power becomes larger on the long wavelength side. Therefore, when the signal on the short wavelength side is eliminated, the remaining signal light on the long wavelength side cannot obtain power from the short wavelength side, thereby causing the power decrease.

As described above, when the number of wavelengths of the transmitted multiwavelength signal light changes, mainly due to the three factors of the SHB, the gain deviation, and the SRS, the signal light power of the remaining signal light (remaining channel) varies. Even if the variation per span is not significantly large, the variation in light power of each signal wavelength produced in each of the optical amplifiers and the optical fiber transmission lines is accumulated in a long distance system provided with a number of stages of optical amplifiers (see reference number 103 in FIG. 6) that respectively perform AGC.

With an optical transmission system like the conventional art in which the transmission distance is short and only a smaller number of optical amplifiers are provided, such a variation is indifferent and does not cause a problem. However, in the future, an increasing number of optical amplifiers along with the increase in the distance of the system may cause the optical signals power on the reception end to exceed the tolerance level of reception, resulting in a cause of transmission error.

The technique described in Patent Document 2 does not provide any solution for such a problem.

SUMMARY OF THE INVENTION

The present invention is made in view of the above problem, and its object is to suppress a transitional gain variation when a number of signal wavelengths changes, and to maintain communication quality of optical signals.

To this end, an optical transmission apparatus according to the present invention includes: an optical power control device that varies light power of light for each wavelength component corresponding to a wavelength channel, the light including signal light and spontaneous emission light; a wavelength arrangement information obtaining unit that obtains arrangement information of the wavelength channel of the signal light; and a control unit that controls the power control device based on the arrangement information obtained at the wavelength arrangement information obtaining unit so that light power of a wavelength component of the signal light and light power of a wavelength component other than the wavelength component of the signal light become substantially equal.

In this case, the optical transmission apparatus may further include a wavelength demultiplexer that splits input light for each wavelength component corresponding to the wavelength channel, the input light including input signal light and the spontaneous emission light; and a switching unit that switches between dropping light of each wavelength component split at the wavelength demultiplexer to a drop path and passing the each wavelength component to an output path, and adding light from an add path to the output path, wherein the power control device is constituted by an optical variable attenuation unit that variably attenuates the light power of the light of each wavelength component output through the output path of the switching unit, a wavelength multiplexer is provided that combines the light of each wavelength component that has been variably attenuated at the optical variable attenuation unit and outputs the combined light, and the control unit controls an amount of attenuation of the light power of the light of each wavelength component at the optical variable attenuation unit, based on the arrangement information obtained at the wavelength arrangement information obtaining unit, so that the light power of the wavelength component of the signal light and the light power of the wavelength component other than the wavelength component of the signal light become substantially equal.

Further, preferably, the control unit may control the power control device so that a spontaneous emission light level of the wavelength component other than the wavelength component of the signal light becomes substantially equal to the light power of the wavelength component of the signal light.

Moreover, preferably, the switching unit switches so as to output simulated light, for a wavelength range not used for the signal light to be output signal light.

In this case, the switching unit may switch so as to pass spontaneous emission light as the simulated light, for the wavelength range not used for the signal light to be the output signal light.

Alternatively, the switching unit may switch so as to add the spontaneous emission light as the simulated light from the add path, for the wavelength range not used for the signal light to be the output signal light.

In addition, the switching unit may pass the light split by the wavelength demultiplexer as the simulated light, for the light that is dropped to the drop path but not passed or added as the output signal light out of the wavelength components included in the input signal light.

Further, preferably, an optical amplifier may be disposed at least one of at a preceding stage of the wavelength demultiplexer and at a subsequent stage of the wavelength multiplexer.

Moreover, the optical transmission apparatus may further include a power detecting unit that detects, for each wavelength component, either input power to the optical variable attenuation unit or output power from the optical variable attenuation unit, wherein the control unit controls the optical variable attenuation unit based on a detection result from the power detecting unit so that light power of the each wavelength component becomes a target power that is set for the each wavelength component.

In this case, the control unit may control the optical variable attenuation unit based on the detection result from the power detecting unit so that spontaneous emission light power other than the wavelength component input as the signal light to be the output signal light becomes the target power that is substantially equal to power of the wavelength component input to the wavelength multiplexer as the signal light to be the output signal light.

Further, the power control device may be constituted by a wavelength selecting optical switch capable of variably attenuating for each wavelength component corresponding to the wavelength channel.

Moreover, a method of controlling an optical transmission apparatus according to the present invention is a method of controlling an optical transmission apparatus that is provided with a power control device that varies light power of light for each wavelength component corresponding to a wavelength channel, the light including signal light and spontaneous emission light, the method comprising the steps of: obtaining arrangement information of the wavelength channel of the signal light out of possible wavelength components for the signal light; and controlling the power control device based on the obtained arrangement information, so that light power of a wavelength component of the signal light and light power of a wavelength component other than the wavelength component of the signal light become substantially equal.

As described above, according to the present invention, it is possible to control a power control device so that arrangement information of a wavelength channel for a signal light is obtained, and then, based on the obtained arrangement information, light power of a wavelength component of the signal light is made substantially equal to light power of a wavelength component other than the wavelength component of the signal light. Accordingly, advantages may be obtained such that the transitional gain variation that is caused due to SRS and SHB when the number of signal wavelengths changes is suppressed, and it is possible to maintain the communication quality of the optical signals.

BRIEF DESCRIPTION OF THE DRAWINGS

FIG. 2(a), FIG. 2(b) FIG. 3(a), FIG. 3(b), and FIG. 5 are diagrams respectively showing effects of this embodiment;

FIG. 10(a) and FIG. 10(b) are illustrative diagrams respectively showing examples of variations in signal power due to the change in the number of signal wavelengths;

FIG. 11(a) and FIG. 11(b) are illustrative diagrams respectively showing examples of variations in signal power due to the change in the number of signal wavelengths.

DESCRIPTION OF THE PREFERRED EMBODIMENTS

The following describes an embodiment of the present invention, with reference to the drawings.

It should be noted that, other than the above described object of the present invention, other technical problems, solutions for those technical problems and effects of such solutions also become apparent from the disclosure of the embodiment that follows.

(a) Description of Embodiment

Figure 1:
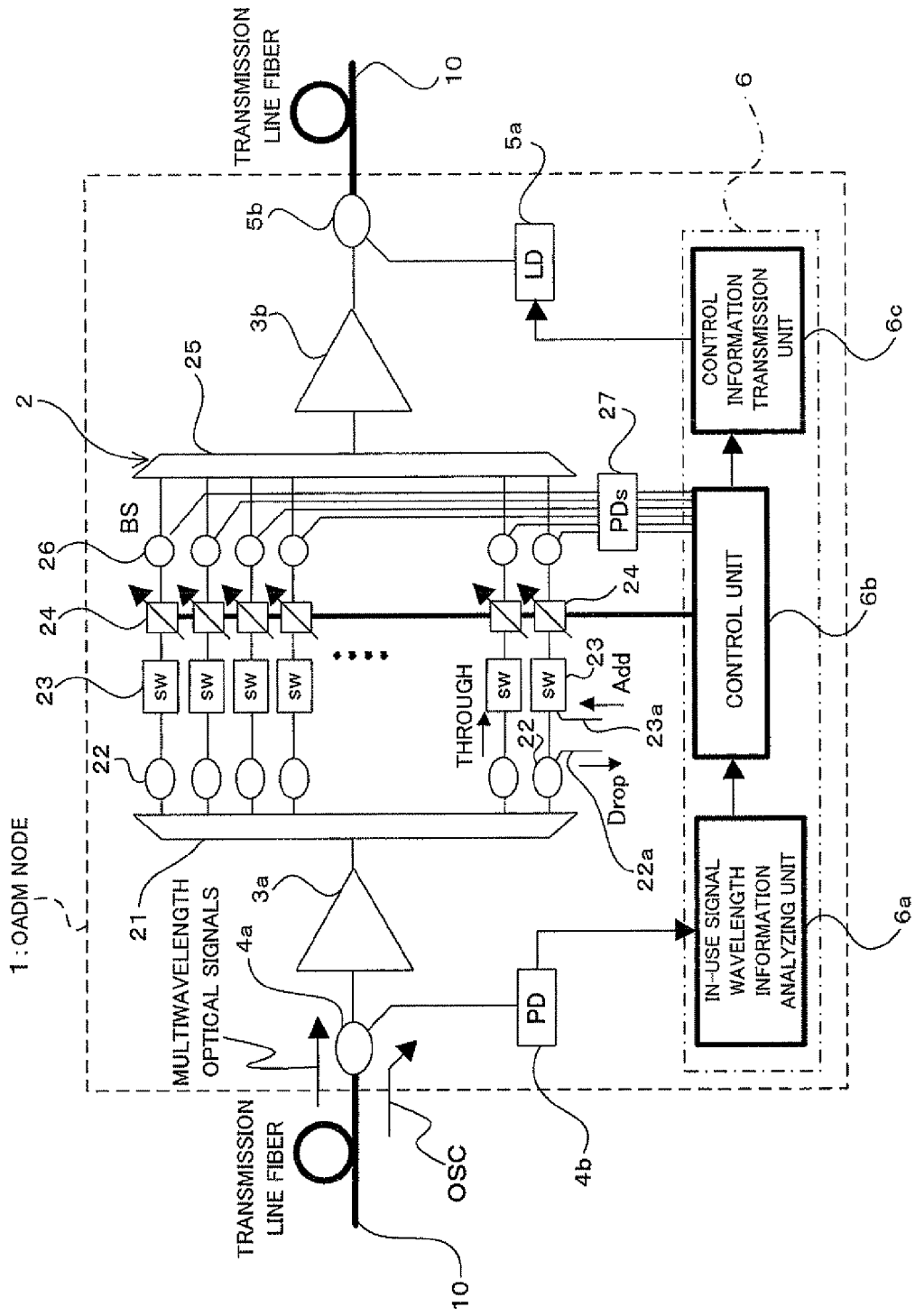
FIG. 1 is a diagram illustrating an optical transmission apparatus according to one embodiment of the present invention.
Figure 6:
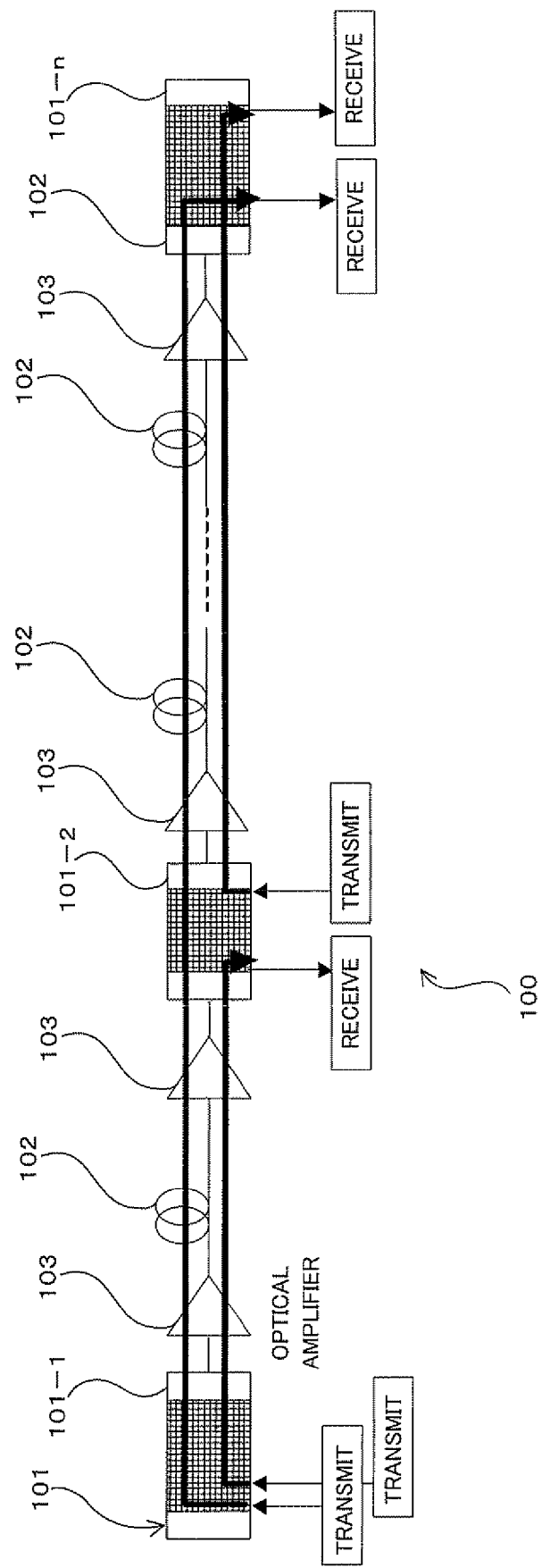
FIG. 6 is a block diagram illustrating a configuration example of a metro core system.
Figure 7:
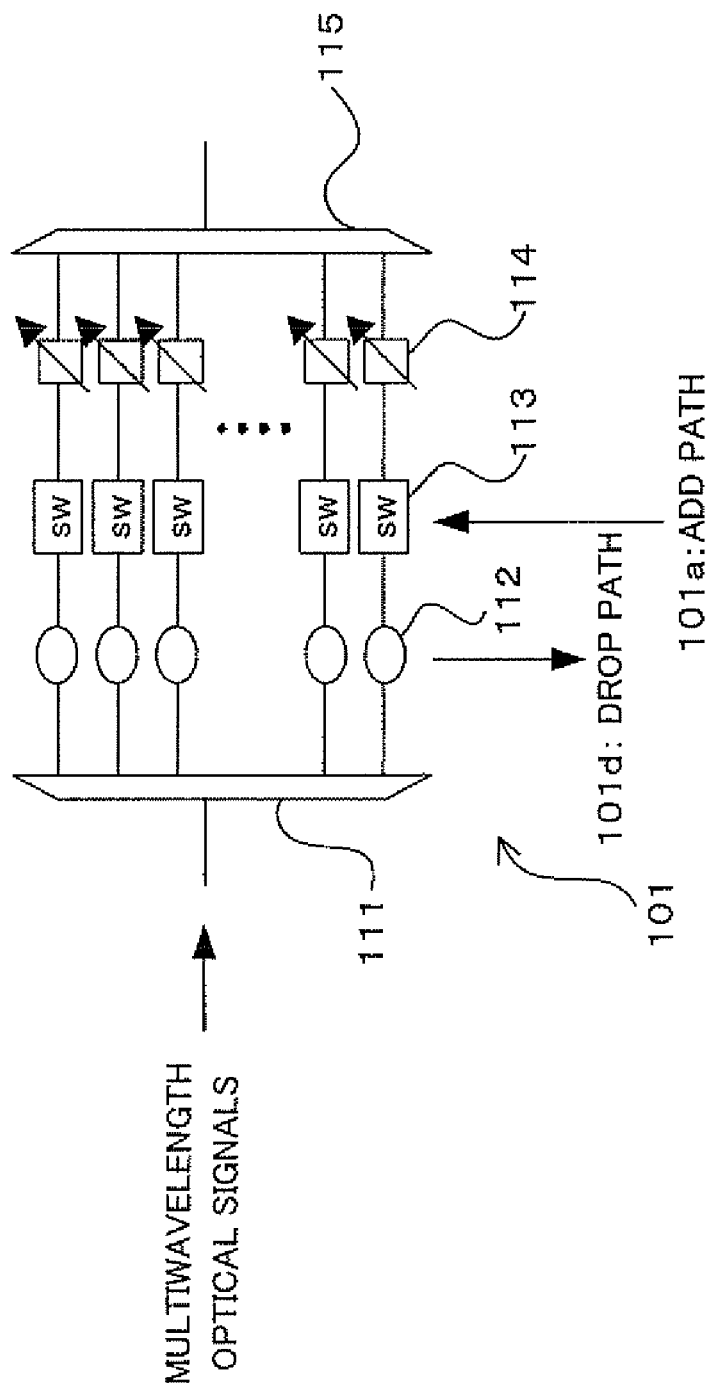
FIG. 7 is a diagram illustrating a configuration example of an OADM node.
Figure 8:
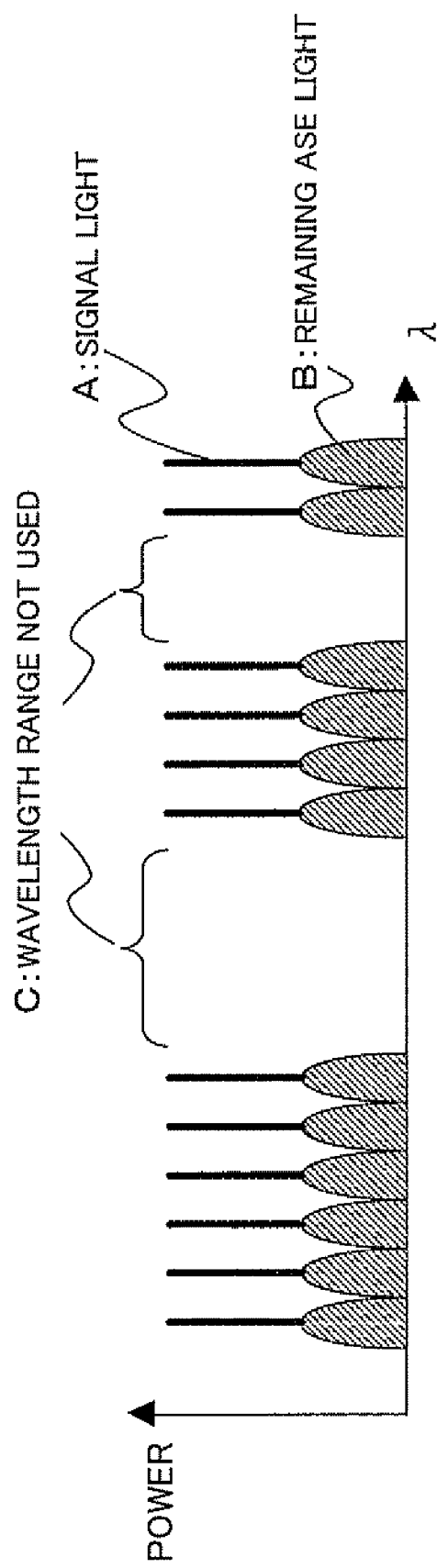
FIG. 8 is a diagram showing an example of spectra of multiwavelength light that is transmitted through a transmission line optical fiber in communication between the OADM nodes.
Figure 9:
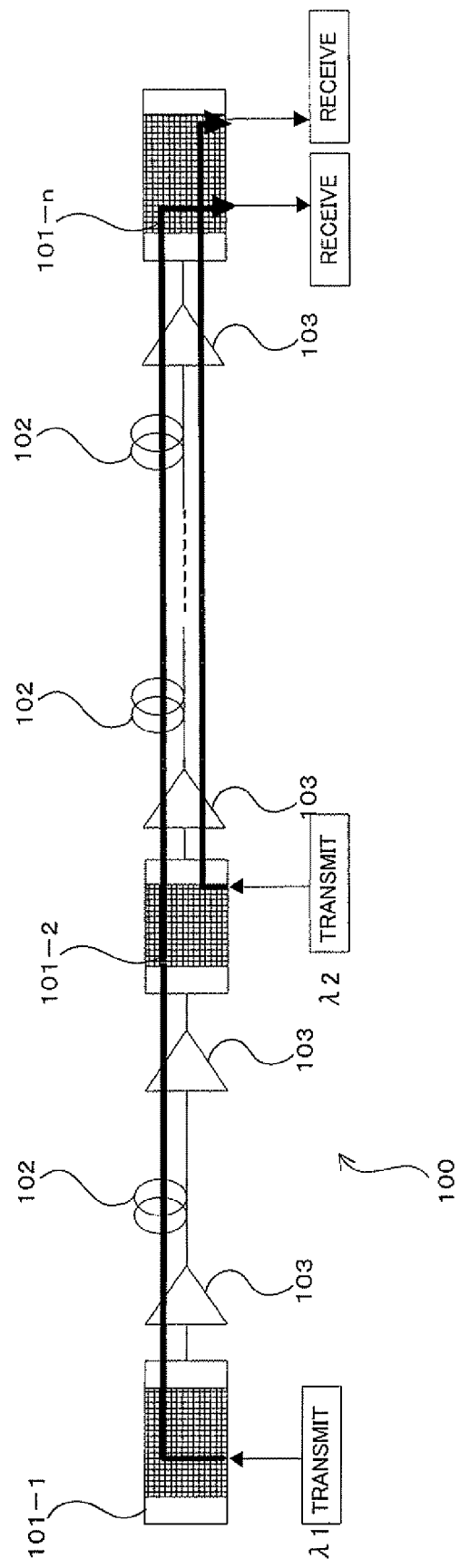
FIG. 9 is an illustrative diagram showing an example of a variation in signal power due to a change in a number of signal wavelengths.

FIG. 1 is a diagram illustrating an optical transmission apparatus 1 according to one embodiment of the present invention. The optical transmission apparatus 1 shown in FIG. 1 is utilized as an OADM node in a multiwavelength optical transmission system such as a metro core system shown in FIG. 6 described above. The optical transmission apparatus 1 includes an OADM unit 2, optical amplifiers 3a and 3b provided respectively on input and output sides of the OADM unit 2, an optical coupler 4a and a photodiode 4b that are provided on the input side of the OADM unit 2, a laser diode 5a and an coupler 5b that are provided on the output side of the OADM unit 2, and further includes a control system 6 that controls addition of loss and optical branching at the OADM unit 2.

At this time, the optical coupler 4a separates multiwavelength optical signals and OSC (Optical Service Channel) light transmitted through a transmission line fiber 10, and outputs the multiwavelength optical signals to the amplifier 3a and the OSC light to the photodiode 4b, respectively. The OSC light includes at least signal wavelength information that is being used in an applied multiwavelength optical transmission system.

Further, the optical amplifier 3a is input with the multiwavelength optical signals from the optical coupler 4a, and compensates a transmission line loss, namely, the loss produced in transmission through the transmission line fiber 10.

While a fiber amplifier such as EDFA may be employed as the optical amplifier 3a, the multiwavelength optical signals amplified by the optical amplifier 3a include ASE light.

The OADM unit 2 is configured to add an optical branching on a wavelength basis for the multiwavelength optical signals input from the optical amplifier 3a, and is provided with a wavelength demultiplexer 21, a beam splitter 22 for dropping, an optical switch 23, a VOA 24, and a wavelength multiplexer 25, as well as with a beam splitter 26 for monitoring and a photodiode 27.

The wavelength demultiplexer 21 demultiplexes input light including input signal light and ASE light (spontaneous emission light) into a plurality of wavelength components. Specifically, at the wavelength demultiplexer 21, the input signal light and the ASE light are demultiplexed into the signal light for respective wavelength channels. Further, the ASE light input to the wavelength demultiplexer 21 is produced along with amplification by the optical amplifier 3a at the preceding stage, and a component produced by an effect of the amplification by the optical amplifier inserted between the transmission line fiber 10 may also be accumulated. Moreover, the ASE light includes wavelength components that cover a wavelength range that the input signal light may take.

The beam splitter 22 for dropping, the optical switch 23, the VOA 24, and the beam splitter 26 for monitoring are provided for each light that has been demultiplexed in the wavelength demultiplexer 21. The beam splitter 22 for dropping is configured to have a part of the input light demultiplexed by the wavelength demultiplexer 21 (split input light) branch to a drop path 22a and outputs the rest of the split input light to the subsequent optical switch 23. The optical switch 23 selectively outputs one of the split input light from the beam splitter 22 for dropping and the signal light for a corresponding wavelength input via an the add path 23a to the subsequent VOA 24. Specifically, in the OADM unit 2, based on setting of the optical switch 23, the wavelength may be set as through by selectively outputting the split input light from the beam splitter 22 for dropping to the subsequent VOA 24, and the wavelength may be set as add by selectively outputting the signal light input through the add path 23a to the subsequent VOA 24.

Consequently, the beam splitter 22 for dropping and the optical switch 23 as described above constitute a switching unit interposed between the wavelength demultiplexer 21 and the VOA 24. Specifically, the beam splitter 22 for dropping and the optical switch 23 as the switching unit switch between dropping each wavelength component that branches at the wavelength demultiplexer 21 to the drop path 22a and passing to the path for output from the wavelength multiplexer 25, and adding the light from the add path 23a to the path for output from the wavelength multiplexer 25.

Further, the VOA 24 is configured to variably attenuate light power of the each wavelength component that branches at the wavelength demultiplexer 21. The VOA 24 is a power control device that has the light power vary for each wavelength component corresponding to a wavelength channel for light including the signal light and the spontaneous emission light (that constitute the multiwavelength signal light). It should be noted that, in a case shown in FIG. 1, the light level is adjusted to be uniformized by variably attenuating the light of each wavelength from the optical switch 23 (to be output through the wavelength multiplexer 25).

Further, the beam splitter 26 for monitoring branches a part of the result of the variable attenuation at the VOA 24 for monitoring purpose, and the photo diode 27 monitors light level of the light branched at the beam splitter 26 for monitoring to output the result of the monitoring to the control system 6.

The control system 6 is provided with an in-use signal wavelength information analyzing unit 6a, a control unit 6b, and a control information transmission unit 6c. The in-use signal wavelength information analyzing unit 6a is configured to, based on the OSC light received through the photodiode 4b, analyze to obtain in-use signal wavelength information included in the OSC light, namely, wavelength arrangement information that is currently used in a multi-wavelength optical transmission system to which the OADM node 1 is applied, which is the wavelength arrangement information of the signal light transmitted to transmission line fiber 10 on the downstream side from the OADM node 1 after the variable attenuation at the VOA 24. As described above, the in-use signal wavelength information analyzing unit 6a is a wavelength arrangement information obtaining unit that obtains the arrangement information of the wavelength channel of the signal light.

Further, the control unit 6b includes the control unit 6b that controls an amount of the variable attenuation at each VOA 24 by feedback control based on the monitoring result from the photodiode 27, and that controls the switching at the optical switch 23 based on the setting of add-drop and through for each wavelength obtained from the wavelength arrangement information obtained at the in-use signal wavelength information analyzing unit 6a, and the control information transmission unit 6c that transmits the signal wavelength information that is currently used in the OADM node 1 to the subsequent OADM node (that is to be transmitted and on the downstream side).

At this point, in response to the analysis result of the in-use signal wavelength information from the in-use signal wavelength information analyzing unit 6a, the control unit 6b controls the optical switch 23 to output simulated light for a wavelength range that is not used as signal light to be output signal light output from the wavelength multiplexer 25. Specifically, the control unit 6b may, by controlling the optical switch 23, pass (through) the ASE light accumulated from the transmission line fiber 10 on the upstream side as the simulated light for the light of the wavelength range that is not used as the output signal light out of the wavelength components that have been branched at the wavelength demultiplexer 21. Alternatively, the optical switch 23, in response to the control by the control unit 6b, may add the ASE light from the add path 23a as the simulated light for the wavelength range that is not used as the output signal light. In these cases, at the control unit 6b, the amount of variable attenuation at the VOA 24 is controlled so that the amount of variable attenuation for the wavelength component to be the output signal light output from the wavelength multiplexer 25 becomes larger than the amount of variable attenuation for the wavelength component other than the wavelength component of the output signal light, thereby making the output power of the respective wavelength components roughly at a equivalent target level.

Moreover, a wavelength that is dropped at the beam splitter 22 for dropping but not passed (through) or added at the optical switch 23 as a component of the output signal light may be passed as simulated light from the beam splitter 22 for dropping. In this case, the amount of variable attenuation for the wavelength component to be the output signal light output from the wavelength multiplexer 25 and the amount of variable attenuation for the wavelength component that has been passed as the simulated light from the beam splitter 22 for dropping are substantially equal and made so as to be the target level at which the output power of the wavelength components are equal.

Specifically, as described above, for the wavelength component other than the wavelength component to be the output signal light, the simulated light is to be input to the VOA 24. However, at the control unit 6b, the VOA 24 is controlled so that the light power of the wavelength component to be the output signal and the simulated light becomes the same target power Ob as shown in FIG. 2(a) below.

In other words, the control unit 6b controls the amount of attenuation for the light power of the each wavelength component at the VOA 24 so that, based on the wavelength arrangement information of the signal light obtained at the in-use signal wavelength information analyzing unit 6a, the light power of the wavelength component of the signal light and the light power of the wavelength component other than the wavelength component of the signal light are substantially equal.

When paying attention to the light power of the each wavelength output from the VOA 24 but not to the amount of attenuation of the VOA 24, the control unit 6b feedback controls the amount of variable attenuation of each VOA 24 so that, for the wavelength range that constitutes the output signal light, in the wavelength range that is not used for the signal light, the level of spontaneous emission light included in the input signal light is at the signal light level that is substantially equal to target power with the output signal light.

Specifically, as shown in FIG. 2(a), it is assumed that it is determined that $\lambda 1$ and $\lambda 2$ are in-use wavelengths at the in-use signal wavelength information analyzing unit 6a, and optical signals of wavelengths of $\lambda 1$ and $\lambda 2$ are set to be passed through at the control unit 6b. In this case, the amount of attenuation of the VOA 24 to which the input signal light and the ASE light for the wavelengths $\lambda 1$ and $\lambda 2$ are input is made larger than the amount of attenuation of the VOA 24 to which the light of an unused wavelength other than the wavelengths $\lambda 1$ and $\lambda 2$ (see C in FIG. 2(a)).

For example, as shown in FIG. 2(a), while it is originally assumed that the ASE light of a uniformized level over the $\lambda 1$, $\lambda 2$ and the unused wavelength ranges are input to the VOA 24, it is possible to make the amount of attenuation of light for $\lambda 1$ and $\lambda 2$ larger than the amount of attenuation at the unused wavelength C, and uniformize the signal light level for $\lambda 1$ and $\lambda 2$ and the ASE light level at the unused wavelength range.

In this manner, for example, as shown in FIG. 2(b), when the signal light in the wavelength $\lambda 1$ is not input, in comparison with the conventional art shown in FIG. 11(a) and FIG. 11(b) it is possible to make a gain variation factor of such as the SHB and the SRS not to be easily generated, and accordingly, the influence of the gain variation of the remaining signal light wavelength $\lambda 2$ to the subsequent OADM node may be made minimum.

For example, as shown in FIG. 3(a) and FIG. 3(b), even when the signal light input to the optical amplifier 3a is reduced from two wavelengths ($\lambda 1$, $\lambda 2$) to one wavelength ($\lambda 2$), the ASE light that has grown corresponding to the signal power is present in the unused wavelength range other than $\lambda 1$ and $\lambda 2$. Accordingly, if the number of wavelengths that the OADM node 1 can contain is 40 wavelengths, substantial light power is only reduced to 39-wavelength amplification from 40-wavelength amplification. In this manner, even if a ratio of variation in the used number of wavelengths is large, because the unused wavelength range is set to be substantially at the same level as the signal light level, the influence of the SHB and the influence due to the SRS in the transmission line to the variation in signal power become smaller (the value of Pd shown in FIG. 3(b) is made smaller than that in the case of FIG. 11(b)), and thus the accumulation of the amount of signal power variation may be suppressed.

Further, because it is possible to transmit the wavelength information used as the output signal light as the OSC light through the downstream side transmission line fiber 10 using the control information transmission unit 6c, at a OADM node having the same configuration as the OADM node 1 that is connected via the downstream side transmission line fiber 10, the in-use wavelength is analyzed from the control information transmitted from the control information transmission unit 6c of the OADM node 1 to control the optical switch and the VOA in the same manner.

Figure 4:
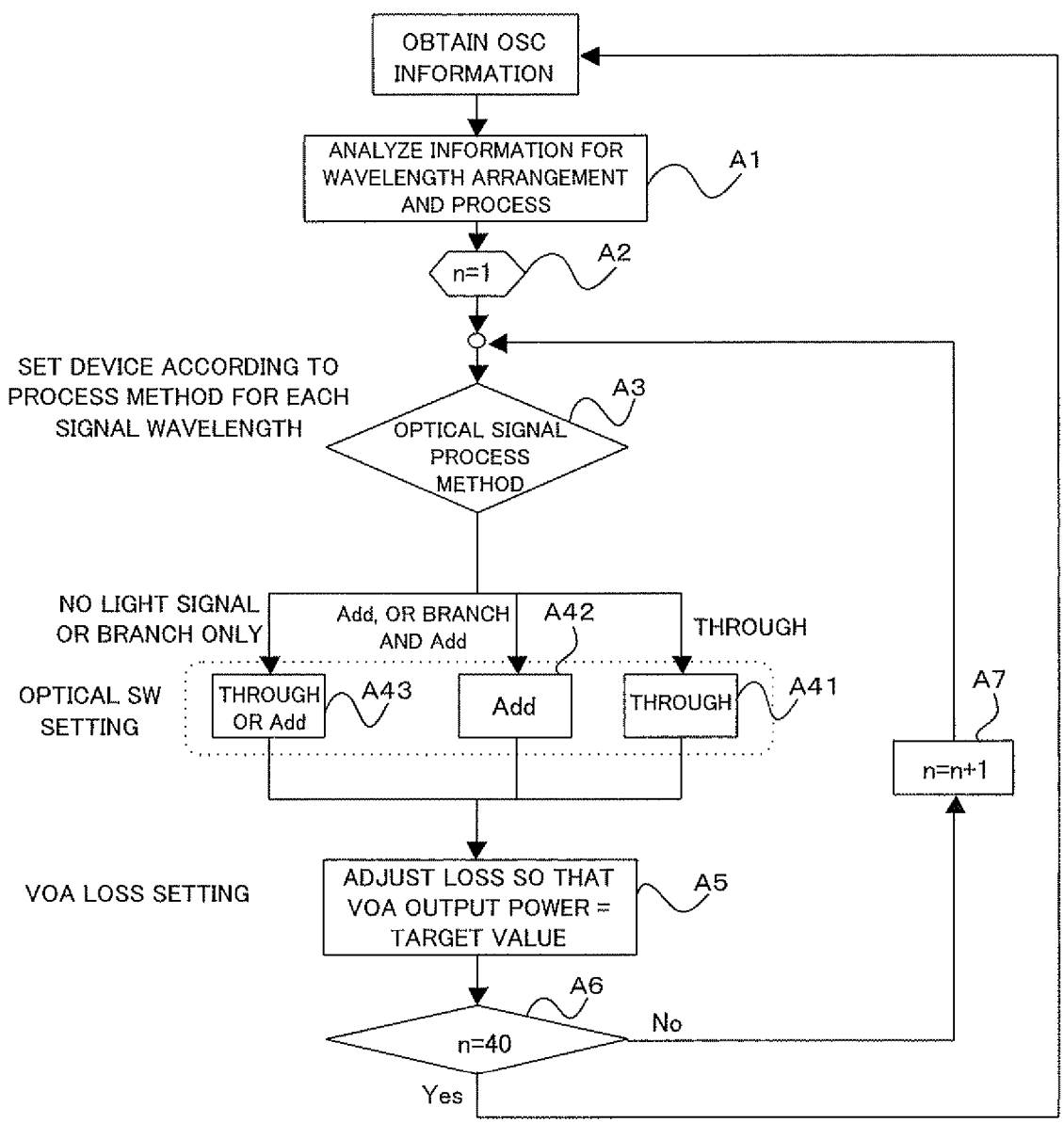
FIG. 4 is a flowchart for explaining an operation in this embodiment.

In the so configured OADM node 1 according to the first embodiment, the control unit 6b constituting the control system 6 performs the setting of the optical switch 23 and the VOA 24 for each wavelength channel split by the wavelength demultiplexer 21 according to the in-use signal wavelength information (see Step A1 in FIG. 4) from the in-use signal wavelength information analyzing unit 6a (Step A2 to Step A3, Step A41 to Step A43, Step A5, and No route in Step A6 to Step A7).

Specifically, at the in-use signal wavelength information analyzing unit 6a, information of the wavelength component other than wavelength component used as the output signal light and the wavelength component used as the output signal light out of the wavelength components that can be taken as the output signal light is obtained, and at the control unit 6b, the VOA 24 is controlled based on the wavelength arrangement information obtained at the in-use signal wavelength information analyzing unit 6a, so that the light power of the wavelength component of the signal light and the light power of the wavelength component other than the wavelength component of the signal light become substantially equal. Note that, in a flowchart in FIG. 4, when the number of the contained wavelength channels is 40, the optical switch 23 and the VOA 24 are set for each wavelength channel with n=1 to 40.

Specifically, at the control unit 6b, as methods of processing the optical signals for each signal wavelength, any one mode is chosen from: (1) dropping at the OADM node 1 thereof, (2) adding the signal light from the add path 23a at the OADM node 1 thereof, (3) letting pass through the OADM node 1 thereof, and (4) wavelength that is not in operation (not used) (Step A3), and the switching of the optical switch 23 is controlled according to respective setting modes and the amount of variable attenuation at the VOA 24 is set (Step A41 to Step A43).

First of all, as for the wavelength that passes through the OADM node 1 thereof as the signal light wavelength, the corresponding optical switch 23 is set to output (through) the light form the beam splitter 22 for dropping to the corresponding VOA 24 as through signal light, and the corresponding VOA 24 is set with the amount of attenuation so that the through signal light power is made as a predetermined target power ("through" in Step A3 to Step A41, and Step A5). This setting control of the amount of attenuation for the VOA 24 by the control unit 6b is feedback controlled so that the light level output from the VOA 24 is made to be a predetermined target value (see level Ob in FIG. 2) based on the result of monitoring from the photodiode 27.

Further, regardless of whether or not to drop at the OADM node 1, as for the wavelength that adds the signal light from the add path 23a at the OADM node 1 thereof, the corresponding optical switch 23 is set to output (add) the light form the add path 23a to the corresponding VOA 24, and the corresponding VOA 24 is set with the amount of attenuation so that the added signal light power is made the target power Ob ("add, or branch and add" in Step A3 to Step A42, and Step A5). This setting control of the amount of attenuation for the VOA 24 by the control unit 6b is also feedback controlled so that the light level output from the VOA 24 is made to be a predetermined target value (see level Ob in FIG. 2) based on the result of monitoring from the photodiode 27.

Moreover, as for the wavelength that is dropped at the OADM node 1 thereof and neither added nor passed at the subsequent OADM node, or the wavelength that is not in operation, the corresponding optical switch 23 is set to output (through) the light form the beam splitter 22 for dropping to the corresponding VOA 24 as simulated light, and the corresponding VOA 24 is set with the amount of attenuation so as to become the target power Ob ("no optical signal or branch only" in Step A3 to Step A43, and Step A5.

In this case, the amount of attenuation is set so that the level of the simulated light (the signal light in a case of the wavelength in operation but neither adding nor passing, and the ASE light in a case of the wavelength not in operation) becomes the same as the signal light level in operation. That is, at the control unit 6b, the corresponding VOA 24 is feedback controlled so that the ASE light level output from the corresponding VOA 24 is made to be the predetermined target value (see level Ob in FIG. 2(a)) based on the monitoring result from the photodiode 27.

As shown above, at the control unit 6b, the output optical power from the VOA 24 adjusts the VOA loss to be the target value Ob that is a predetermined value set based on the system light level. This adjustment is performed in the same operation regardless of the in or out of operation of the signal of the corresponding wavelength. Note that, when the light power input to the VOA 24 is low and it is not possible to obtain the target value of the light power even if the loss at the VOA 24 is made minimum, the loss of the corresponding VOA 24 is fixed to the minimum state.

The above described FIG. 2(a) and FIG. 2(b) are diagrams showing light spectra of an output from the wavelength multiplexer 25 in the OADM node 1 in this embodiment. In the path of the wavelength that does not use the signal light in the OADM node 1, the optical switch 23 in the node 1 is set to "through" by the control unit 6b, and let the ASE light accumulated from the upstream of the OADM node 1 pass to the downstream. While the ASE light receives the loss from the VOA 24 after passing the optical switch 23, as described above, the loss of the corresponding VOA 24 is positively set smaller.

On the other hand, in the path of the wavelength that uses the signal light, the VOA loss becomes greater than when the VOA 24 is in an open state because the signal power is adjusted at the corresponding VOA 24. Accordingly, if the ASE power increases more for the wavelength that does not use the signal light, and further if the light power output from the VOA (the output power of the ASE light) is adjusted to be the equivalent level as the signal power to increase to the equivalent level, then it will not increase more than that.

The following explains a case in which a maximum number of signal wavelengths that may be used in the system is 40 wavelengths and the number of signal wavelengths that is actually in use decreases from the optical signals of two wavelengths ($\lambda 1, \lambda 2$) to the optical signals of one wavelength ($\lambda 2$). In the two wavelength state before change, there are 38 signal wavelengths that are unused, and in the present invention, 38-wavelength ASE increases to correspond to the signal power. That is, even if the number of signal wavelengths that is actually used is two, the optical amplifiers 3a and 3b perform the operation corresponding to 40 wavelengths. Moreover, the ASE light remains even if signals transmitted due to an error in the upstream side transmission apparatus are reduced to one wavelength, and therefore the operation corresponding to 39 wavelength operation is realized.

Further, FIG. 3(a) and FIG. 3(b) are diagrams showing light spectra of an output from the optical amplifier 3a or 3b in this embodiment. As described above, even if the signals input to the optical amplifier are reduced from two wavelengths to one wavelength, the ASE is present that increases so as to correspond to the signal power, and accordingly, it is reduced from 40-wavelength amplification to 39-wavelength amplification. In this manner, when the change in the number of wavelengths is small, the influence of the SHB and the influence due to the SRS in the transmission line to the variation in signal power become smaller, and thus the accumulation of the amount of signal power variation may be suppressed.

Figure 5:
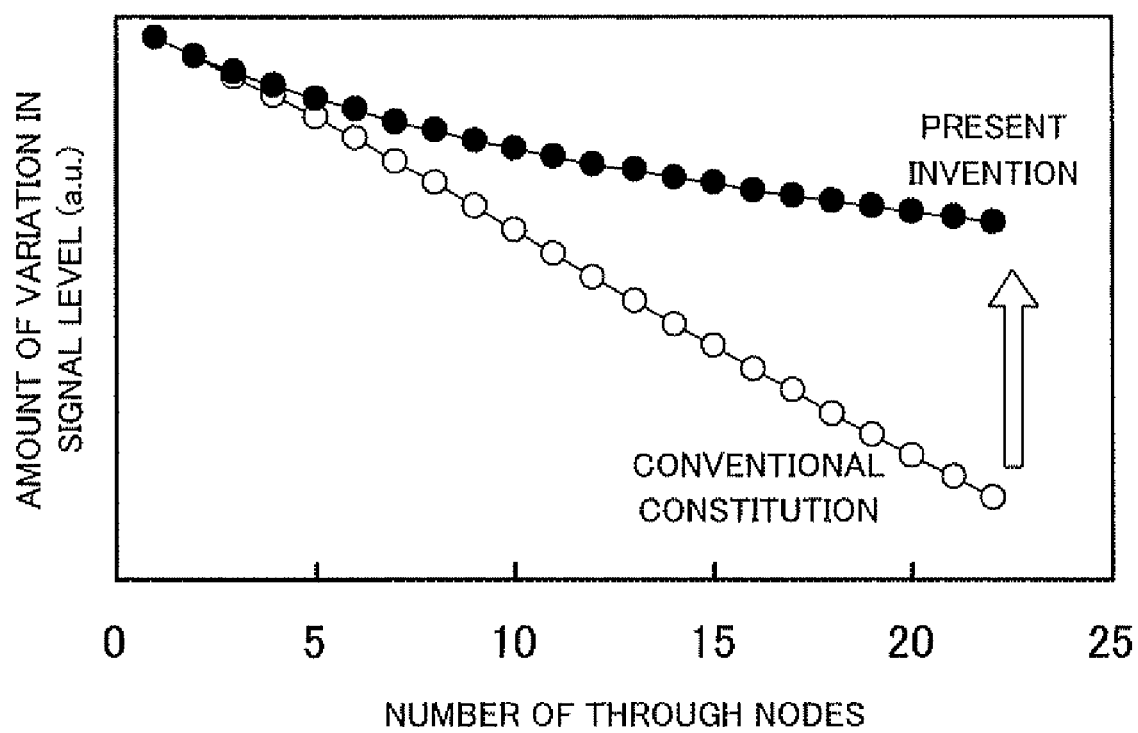

FIG. 5 is a diagram showing an example of an effect of improvement in the accumulation of the signal power variation according to the present invention. In this diagram, the amount of power variation at a wavelength multiplexer output point for each node for the signal λ2 is plotted when a system constituted by 23 nodes (#0 to #22) is assumed. Provided that in a state in which one wavelength (λ1) signal is transmitted from the node #0 to the node #22 and one wavelength (λ2) signal is transmitted from the node #1 to the node #22, the transmission function for one wavelength from the node #0 does not operate due to an error. As shown in FIG. 5, it is possible that a large amount of signal power variation may be suppressed in comparison with the conventional configuration.

As described above, the OADM node according to the present invention may significantly suppress the amount of variation in the signal power that is transitionally caused when the number of signal wavelengths changes in comparison with the conventional example. Therefore, even when the OADM nodes are provided with cascading connection in the optical network, an improvement may be expected in communication quality when the number of wavelengths changes quality.

As described above, according to the present invention, it is possible to control the VOA 24 with the control unit 6b so that the light power of the wavelength component of the signal light is made substantially equal to the light power of the wavelength component other than the wavelength component of the signal light based on the arrangement information obtained at the in-use signal wavelength information analyzing unit 6a. Accordingly, advantages may be obtained such that the transitional gain variation that is caused due to the SRS and the SHB when the number of signal wavelengths changes is suppressed, and it is possible to maintain the communication quality of the optical signals.

(b) Others

Regardless of the above-described embodiment, the present invention may be implemented with various modifications without departing the scope and the spirit of the claimed invention.

For example, other than the configuration of the OADM node as shown in FIG. 1, in a configuration using a wavelength selection switch (WSS: Wavelength Selective Switch) as described in U.S. Pat. No. 6,661,948, it is possible to employ a configuration as the control unit controlling the power control device so that the light power of the wavelength component of the signal light is made substantially equal to the light power of the wavelength component other than the wavelength component of the signal light based on the arrangement information obtained at the wavelength arrangement information obtaining unit.

In this case, for the light including the signal light and spontaneous emission light, the WSS functions as the light power control device that has the light power vary for each wavelength component corresponding to the wavelength channel. The fact that the WSS can have the light power vary for each wavelength component corresponding to the wavelength channel, more specifically, that the WSS can control the amount of attenuation, is described in the above listed U.S. Pat. No. 6,661,948.

Figure 12:
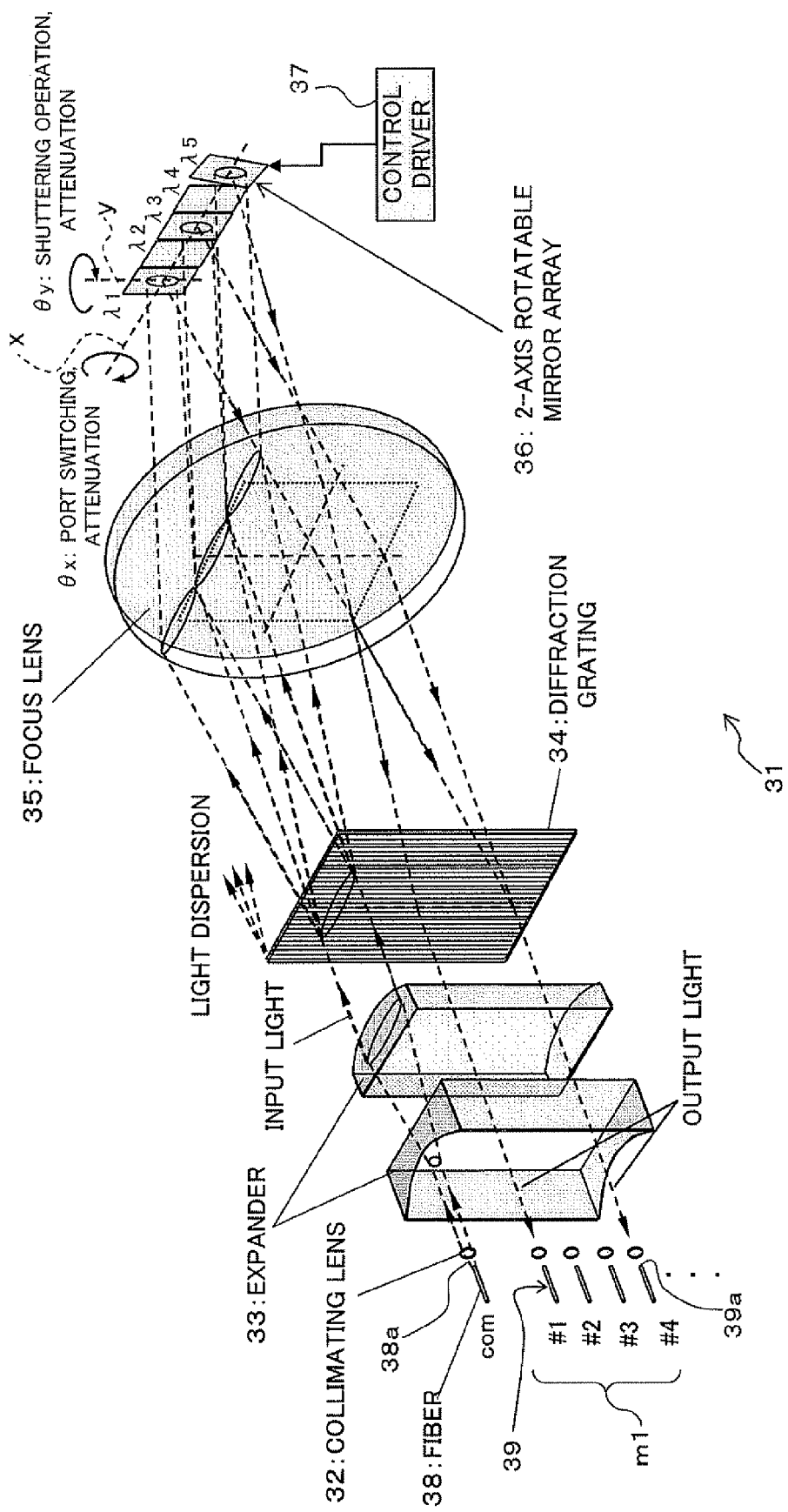
FIG. 12 is an illustrative diagram showing a configuration example of a wavelength selection switch.

FIG. 12 is a diagram showing a configuration example of the WSS. A WSS 31 shown in FIG. 12 is an optical switch capable of switching an output target of light beams from m (m is a natural number) optical input ports among n (n is a natural number) optical output ports for each wavelength. Note that, in FIG. 12, a number of optical output ports 39 corresponding to one optical input port is especially set to m1 (m1 is a natural number greater than 4).

Here, an input optical fiber 38 having an end surface 38a constituting the optical input port and an output optical fiber 39 having the optical output ports 39a are arranged so that respective end surfaces 38a and 39a face the same direction, and the WSS 31 is capable of directing the light emitted from the end surface 38a to the output optical fiber 39 to be the output target while setting outward and backward optical paths for each light of the wavelength channel in operation. At the same time, by adjusting efficiency of the coupling to the output optical fiber 39, the optical signal power output to the output optical fiber 39 may be attenuation controlled to be equalized.

For this purpose, the WSS 31 is provided with a collimator 32, an expander 33, a diffraction grating 34, a focus lens 35, and a movable mirror array 36, and the outward and backward optical paths are set between the end 38a of the input optical fiber 38 that constitutes the optical input port and the end 39a of the output optical fiber 39 that constitutes the optical output ports, and further includes a control driver 37 that drives the movable mirror array 36.

Here, the collimator 32 outputs light of the outward optical path from the above described input optical fiber 38 to the subsequent expander 33 as collimated light, and couples the collimated light on the in-use channel from the expander 33 in the backward optical path to the output optical fiber 39.

Further, the expander 33 outputs the collimated light via the outward optical path from the collimator 32 to the diffraction grating 34 as light in a beam shape extending in an X axis direction in FIG. 12. Moreover, the expander 33 outputs the light via the backward optical path from the diffraction grating 34 as collimated light of the collimated light extending in the X axis direction that is narrowed in a beam width. The expander 33 may be constituted by a pair of lens bodies as shown in FIG. 12. Thus, the above collimator 32 and the expander 33 constitute a collimating unit that collimates the light from optical input port.

Moreover, the diffraction grating 34 disperses the collimated light via the outward optical path from the expander 33, and emits each component of the wavelength channel toward the focus lens 35 at different angles (extending in the X axis direction in the drawing). In addition, the diffraction grating 34 emits light via the backward optical path from the focus lens 35 toward the expander 33 at different angles for respective components of wavelength channel. Thus, the diffraction grating 34 constitutes a dispersion unit that disperses the light from the collimating unit.

Further, the focus lens 35 converts all of the beams incident at different angles for each optical wavelength into collimated beams, and has the collimated beams incident at a focal position of different mirrors 36a that constitutes the movable mirror array 36 and forming different angles for each light of the wavelength channel. Further, the light in the backward optical path reflected by the mirror 36a constituting the movable mirror array 36 is output to the diffraction grating 34. Thus, the focus lens 35 constitutes a converging unit that converges the light beams for each wavelength that have been dispersed by the dispersion unit.

Further, the movable mirror array 36 includes the mirrors 36a that are arranged at the focal position of the focus lens 35 along the X axis (that correspond to the dispersion direction by the diffraction grating 34). Each mirror 36a is configured to individually reflect the light for the wavelength channels that are dispersed by the diffraction grating 34 (λ1 to λ5 in FIG. 1), and a reflection surface thereof is provided rotatably about the X axis and a Y axis. Therefore, an angle of the reflection surface may be set independently with respect to the above mentioned X and Y axes. In other words, the mirrors 36a constituting the movable mirror array 36 constitute a rotating mirror having a plurality of rotating axes intended to independently reflect the light beam for each wavelength that is converged by the converging unit.

Here, each of the mirrors 36a that constitutes the movable mirror array 36 is configured to set the output optical fiber 39 to be coupled to one of the optical fibers 39 #1 to #m1 in FIG. 12 based on setting of an inclined angle θx with respect to the X axis in response to driving by the control driver 37 described later. Further, based on setting of an inclined angle θy with respect to the Y axis, on and off of the optical coupling to the output optical fiber 39 can be switched between the wavelength channel in operation and the wavelength channel on hold.

Specifically, when an amount of rotation control for the Y axis is substantially 0 degree, the light reflected at the mirror 36a is output, via the focus lens 35, the diffraction grating 34, the expander 33, and the collimator 32, by coupling to the output optical fiber 39 set by an angle of the X axis of the corresponding mirror 36a. In contrast, each of mirrors 36a that constitutes the movable mirror array 36 has the reflection surface angle θy for the Y axis incline, and by this, the light reflected on the each of the mirrors 36a is emitted, via the focus lens 35, the diffraction grating 34, and the expander 33, to a region that is diverted from the optical path to the collimator 32 to be coupled to the output optical fiber 39 (shutter operating region).

Further, by adjusting θx and θy for each of the mirrors 36a, the light level coupled to the output optical fiber 39 may be attenuated to the target level set for each wavelength channel.

Further, the control driver 37 is configured to adjust the reflection surface angle for the X and Y axes of the corresponding mirrors 36a independently by driving the mirrors 36a to reflect the optical signals of the corresponding wavelength channel according to the setting of the output optical fiber 39 that is the output target for each optical signal of the wavelength channel for the multiwavelength optical signals input from input optical fiber 38. That is, each of the mirrors 36a is configured to be inclined by an angle that is set individually, by means of external force generated from driving of the movable mirror array 36 by the driver 37.

The WSS 31 so configured, for the multiwavelength optical signals input from the input optical fiber 38, switches the output optical fiber 39 to be the output target for each optical signal of the wavelength channel by controlling the reflection surface angle of the mirror 36a for each wavelength of the light beam to be reflected. The WSS 31 also performs equalization process by adjusting efficiency of the coupling of the optical signals of the output wavelength channel to the output optical fiber 39.

Further, in the above described embodiment, the description is given to the case where the OADM node is applied with the VOA, the configuration for obtaining the wavelength arrangement information, and the configuration for controlling the VOA as the power control device based on the obtained wavelength arrangement information so that the light power of the wavelength component of the signal light and the light power of the wavelength component other than the wavelength component of the signal light become substantially equal. However, the above configurations of the present invention may be applied to the configuration other than the OADM node, and also in this case, the transitional gain variation that is caused due to SRS and SHB when the number of signal wavelengths changes is suppressed, and it is possible to maintain the communication quality of the optical signals.

Further, in the OADM node 1 according to the above described embodiment, the optical amplifiers 3a and 3b as the post amplifier and the preamplifier are provided. However, the optical amplifiers are not necessarily mounted inside the optical transmission apparatus. Inserting at least one optical amplifier at the upstream side of the transmission line optical fiber allows output of the ASE light to the downstream side transmission line optical fiber for suppressing the gain variation when the number of signal wavelengths changes.

Moreover, based on the above disclosure of the embodiment, a person skilled in the art may readily manufacture the apparatus according to the present invention.

What is claimed is:

1. An optical transmission apparatus, comprising:
   an optical power control device that varies light power of light for each wavelength component corresponding to a wavelength channel, the light including signal light and an ASE light;
   a wavelength arrangement information obtaining unit that obtains arrangement information of the wavelength channel of the signal light; and
   a control unit that controls the power control device based on the arrangement information obtained at the wavelength arrangement information obtaining unit so that light power of a wavelength component of the signal light and light power of a wavelength component other than the wavelength component of the signal light become substantially equal.

2. The optical transmission apparatus according to claim 1, further comprising:
   a wavelength demultiplexer that splits input light for each wavelength component corresponding to the wavelength channel, the input light including input signal light and the ASE light; and
   a switching unit that switches between dropping light of each wavelength component split at the wavelength demultiplexer to a drop path and passing the each wavelength component to an output path, and adding light from an add path to the output path, wherein
   the power control device is constituted by an optical variable attenuation unit that variably attenuates the light power of the light of each wavelength component output through the output path of the switching unit,
   a wavelength multiplexer is provided that combines the light of each wavelength component that has been variably attenuated at the optical variable attenuation unit and outputs the combined light, and the control unit controls an amount of attenuation of the light power of the light of each wavelength component at the optical variable attenuation unit, based on the arrangement information obtained at the wavelength arrangement information obtaining unit, so that the light power of the wavelength component of the signal light and the light power of the wavelength component other than the wavelength component of the signal light become substantially equal.

3. The optical transmission apparatus according to claim 1, wherein the power control device is constituted by a wavelength selecting optical switch capable of variably attenuating for each wavelength component corresponding to the wavelength channel.

4. The optical transmission apparatus according to claim 2, wherein the switching unit switches so as to output simulated light, for a wavelength range not used for the signal light to be output signal light.

5. The optical transmission apparatus according to claim 4, wherein the switching unit switches so as to pass ASE light as the simulated light, for the wavelength range not used for the signal light to be the output signal light.

6. The optical transmission apparatus according to claim 4, wherein the switching unit switches so as to add the ASE light as the simulated light from the add path, for the wavelength range not used for the signal light to be the output signal light.

7. The optical transmission apparatus according to claim 4, wherein the switching unit passes the light split by the wavelength demultiplexer as the simulated light, for the light that is dropped to the drop path but not passed or added as the output signal light out of the wavelength components included in the input signal light.

8. The optical transmission apparatus according to claim 2, further comprising:
an optical amplifier disposed at least one of at a preceding stage of the wavelength demultiplexer and at a subsequent stage of the wavelength multiplexer.

9. The optical transmission apparatus according to claim 2, further comprising:

a power detecting unit that detects, for each wavelength component, either input power to the optical variable attenuation unit or output power from the optical variable attenuation unit, wherein the control unit controls the optical variable attenuation unit based on a detection result from the power detecting unit so that light power of the each wavelength component becomes a target power that is set for the each wavelength component.

10. The optical transmission apparatus according to claim 9, wherein the control unit controls the optical variable attenuation unit based on the detection result from the power detecting unit so that ASE light power other than the wavelength component input as the signal light to be the output signal light becomes the target power that is substantially equal to power of the wavelength component input to the wavelength multiplexer as the signal light to be the output signal light.

11. The optical transmission apparatus according to claim 1, wherein the control unit controls the power control device so that an ASE light level of the wavelength component other than the wavelength component of the signal light becomes substantially equal to the light power of the wavelength component of the signal light.

12. A method of controlling an optical transmission apparatus that is provided with a power control device that varies light power of light for each wavelength component corresponding to a wavelength channel, the light including signal light and ASE light, the method comprising the steps of:
obtaining arrangement information of the wavelength channel of the signal light out of possible wavelength components for the signal light; and
controlling the power control device based on the obtained arrangement information, so that light power of a wavelength component of the signal light and light power of a wavelength component other than the wavelength component of the signal light become substantially equal.

\* \* \* \* \*